United States Patent Office 3,454,164
Patented July 8, 1969

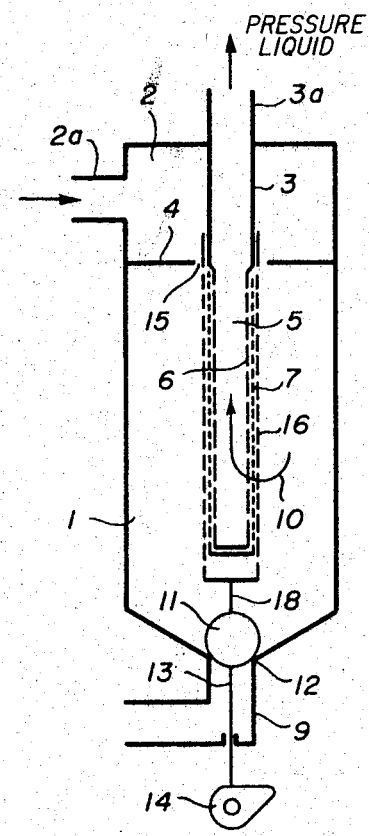
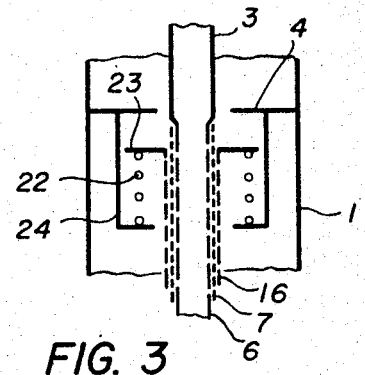
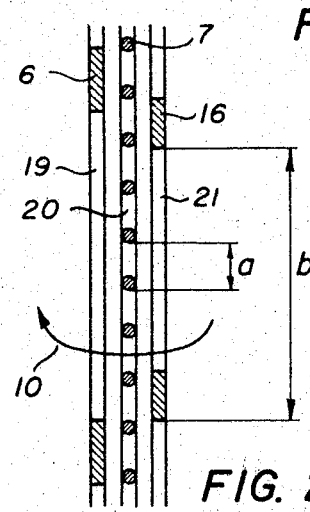
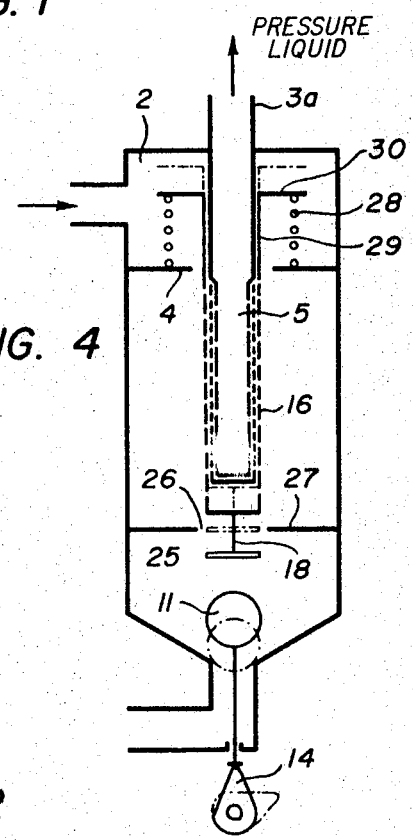
FIG. 1
FIG. 3
FIG. 2
FIG. 4

3,454,164
FILTER ELEMENT SCRAPING DEVICE
Jean-Jacques Asper, Geneva, Switzerland, assignor to Brasco S.A., Geneva, Switzerland, a Swiss body corporate
Filed Sept. 15, 1966, Ser. No. 579,676
Claims priority, application Switzerland, Sept. 16, 1965, 12,858/65
Int. Cl. B01d 35/16
U.S. Cl. 210—108                      9 Claims

ABSTRACT OF THE DISCLOSURE

A cell for filtering a liquid under pressure, in which are provided a meshed filter member, a device for generating a back-flow current in said cell to clean said filter member and a device for scraping said filter member each time the back-flow current generator is operated.

---

This invention relates to a device for scraping the filter element of a filtering cell adapted to be cleaned by a back-flow wash.

It is known to clean the filter elements of filtering cells for liquids under pressure, in particular cells for filtering water, by a backflow cleaning operation. This backflow cleaning operation consists in causing the liquid to circulate in the cells, at least for a brief moment, in a direction opposite to that of filtration so as to detach the impurities that have deposited on the filter elements of the cells. It has been observed, however, that certain impurities, in particular organic impurities, agglomerate in the form of flagella, i.e. filaments having one end hooked to the walls of the filter elements and whose opposite end dangles in the current of liquid. When the liquid flow is in a direction corresponding to filtration, these flagella come to lie against the walls of the filter elements and block their openings. During cleaning, some of these flagella are ripped off by the back-flow current but a large number end up dangling in this current. As soon as flow is resumed in the direction of filtration, these undetached flagella come to lie again against the filter element walls to again block the mesh openings.

An object of the invention is to provide means for ripping off these flagella to ensure effective removal thereof.

According to the present invention there is provided, in or for use in a cell for filtering a liquid under pressure, having a meshed filter member and means for generating a back-flow current in said cell to clean said filter member: a device for scraping said filter member which comprises an open-work scraping member adapted to overlie said filter member in sliding relationship and having interstices larger than the meshes of said filter member, said device further comprising actuating means associated with said filter member and controllable by said back-flow current generating means for slidably displacing said scraping member over said filter member each time said back-flow current generating means are operated.

In the accompanying drawings:

FIGURE 1 shows, in vertical section, filtration apparatus having a filter cell fitted with a first embodiment of a scraping device according to the invention;

FIGURE 2 shows a portion of the scraping device of FIG. 1 on an enlarged scale;

FIGURE 3 represents, in vertical section, a part of a filtration apparatus having a filter cell fitted with a second embodiment of the scraping device according to the invention;

FIGURE 4 is a vertical section of filtration apparatus having a filter cell fitted with a further embodiment of the scraping device according to the invention.

In the several figures of the drawing, the same reference numerals have been used to identify corresponding parts.

Figure 5:
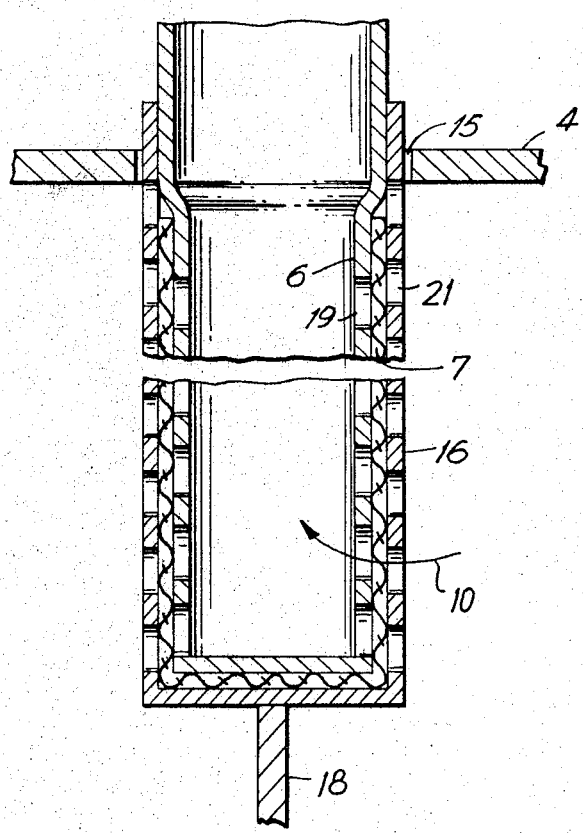
FIGURE 5 is a cross-section on enlarged scale of a part of the filter and scraping device.

The filtration apparatus shown in FIGURE 1 comprises a filter cell 1 surmounted by an inflow chamber 2 having an inlet connecting portion 2a. A tubular element 3, which extends through the inflow chamber 2 and through a central hole formed in the partition 4 between the cell 1 and the inflow chamber and which is provided at its top end with an outlet connecting portion 3a, carries at its bottom end a filter plug 5 comprising a rigid perforated sleeve 6 over which is slipped a filter sleeve 7 consisting of fine-meshed woven material. The lower portion of cell 1 is connected to a discharge conduit 9. A ball 11 closes off the discharge orifice 12 formed by the inlet of conduit 9. This ball acts as a valve member of a discharge valve whose seat is formed by the periphery of orifice 12. The displacement of this ball 11 is controlled by a push-rod 13 which is itself actuated by a cam 14 driven by a motor, not shown. A cylindrical element 16, which has an open-work structure and which is coaxial with the filter plug 5, carries at its bottom end a rod 18 which is secured to the ball 11. The upper end portion of this cylindrical element 16 is adapted to slide axially over the lower end portion of the tubular element 3. An annular passage 15, formed by the space left free between the top end portion of the cylindrical element 16 and the edge of the central hole in partition 4, establishes communication between the inflow chamber 2 and the filtering cell 1, this passage being gauged to set up a through flow resistance greater than that obtaining in the region of ball 11 when the latter is in its open position.

The cylindrical element 16 has an open-work structure substantially coarser than the meshes of the filter sleeve 7. For example, if mesh 20 of the filter sleeve has a size $a = 0.030$ mm., the cylindrical element 16 will have openings 21 whose distance $b = 0.5$ mm. (FIGURE 2).

This arrangement operates as follows. Unfiltered liquid enters the inflow chamber 2 through the connecting portion 2a and flows through passage 15 into cell 1; it then flows in the direction indicated by the arrow 10, through the opening 21 of the cylindrical element 16, then through the meshes 20 of the filter sleeve 7 on which it deposits its impurities. The liquid, once filtered, flows through the holes 19 of the perforated rigid sleeve 6 into the hollow interior of the filter plug 5 and thence through the tubular element 3 and out through the connecting portion 3a. When cam 14 is rotated, it actuates the push-rod 13 and thus causes the ball 11 to rise. This frees the inlet 12 of the discharge conduit 9 and produces, due to the through flow resistance offered by the passage 15, an abrupt depression of the pressure in cell 1 thereby producing back-flow current. The filter sleeve 7 bulges outwards under the action of this back-flow current and comes into intimate contact with the inner surface of the cylindrical element 16. At the same time, the cylindrical element is pushed upwards by the rod 18 and performs an axial sliding displacement, i.e. at right angles to the filtration current, thereby causing it to scrape the filter sleeve 7. The impurities that adhere to the latter, in particular the flagellar impurities referred to above, are shorn off under the action of the displacement of the cylindrical element 16 in relation to the filter sleeve 7. This cylindrical element 16 thus constitutes a scraping member which, in the present example, is sleeve-shaped. As cam 14 continues to rotate, the force exerted on the ball 11 by the flow of liquid towards conduit 9 returns the scraping sleeve to its initial position. As soon as the ball 11 is back in its closing position, filtration is resumed. Meanwhile, the shorn-off impurities will have been discharged by the back-flow current through the orifice 12 and the conduit 9. The ball 11 thus acts both as the back-flow current control member and as an actuation member which causes the cylindrical element 16 to carry out a sliding displacement each time this member initiates a back-flow current. The exent of this sliding displacement must be at least equal to the distance b between the openings of the cylindrical element, i.e. substantially greater than the mesh size a of the filter sleeve 7.

In the embodiment illustrated in FIGURE 1, the cylindrical element 16 must be rigid, e.g. be made of metal, since its sliding displacement is brought about by the thrust exerted by the rod 18. But it could be of advantage to resort to a scraping member which, like the filter sleeve 7, is also made of a woven material but having meshes far larger than those of sleeve 7. In this modified constructional form, illustrated in FIGURE 3, the cylindrical element is kept taut under the action of two forces. The first is set up by the pressure exerted by the liquid on a valve member formed by a ball, as with the ball 11 in the FIGURE 1 embodiment, and the other is produced by a spring 22 which is prestressed between two abutments formed by an outwardly directed flange 23 secured to the top end of scraping sleeve 16 and by an inwardly directed flange 24 inside cell 1 and rigid with partition 4.

The element 16 is not necessarily cylindrical: it suffices if it has a configuration similar to that of the filter member so that, at least while it is sliding, it may be in contact with the latter over its entire area. Moreover, this sliding displacement must be made to take place in a direction perpendicular to that of the filtration current. For example, if the filter member is planar, then the scraping member must also be planar. In the case of a cylindrical filter member, as with the member 7 of plug 5, the scraping member must also be cylindrical, but its sliding displacement could consist of a rotational displacement about the axis of plug 5 instead of an axial displacement: it would suffice suitably to adapt the drive member.

The use of the back-flow current control member as a drive member by securing this control member to the end of the scraping sleeve with rigid connecting means such as rod 18, can give rise to draw-backs, particularly as regards the guiding action expected from the element 16 and as regards the fluid tightness that is expected between the ball 11 and the discharge orifice 12. FIGURE 4 shows an arrangement in which a drive member is provided which makes use of the abrupt depression brought about by the opening of the valve member 11 to produce the axial sliding displacement of the element 16.

In this embodiment, the rod 18 connects the bottom end of the element 16 to a mobile part formed by a disc 25 which, in the absence of a back-flow current, occupies a rest position in which it partly closes off a central hole 26 formed in a partition 27 lying between the filter plug 5 and the discharge orifice 12.

This disc 25 is kept in its rest position by a spring 28 which plays a part similar to that of the spring 22 in FIGURE 3. The element 16 is extended, at its top end, by tubular element 29 which extends through the central hole formed in the partition 4 and carries an outwardly directed flange 30. This ensures better guiding of the scraping member during sliding displacement. The spring 28 is placed between the bottom of the inflow chamber 2 and the shoulder 30; it is prestressed therein to cause the bottom end of the element 16 to abut against the lower end of the filter plug 5, as shown in chain-dotted lines in FIGURE 4.

When the ball closes the orifice 12, i.e. during filtration, the pressures upstream and downstream of partition 27 are the same and the disc 25 is not subjected to any force. As soon as ball 11 opens orifice 12 under the action of cam 14, the pressure drops abruptly downstream of partition 27 and the disc 25 is then subjected to a force which drags it with the back-flow current and which causes the element 16 to perform its sliding movement.

The latter then occupies the position shown in full lines and it remains there as long as the back-flow current lasts, i.e. throughout the cleaning operation period. The impurities pass easily through the hole 26 which is no longer occupied by disc 25. As soon as this back-flow current ceases, the spring 28 returns the element 16 to its rest position.

Because of the absence of a rigid connection between the back-flow current control member and the scraping element, this embodiment is of particular advantage in those cases where this back-flow current control member is placed in a position other than axially of the filter plug 5, as may for instance be the case when the filtration apparatus comprises several, grouped, filtering cells with a common control member for controlling the back-flow current. Moreover, this embodiment lends itself well to the use of a scraping sleeve made of flexible woven material since the spring 28 keeps it constantly taut.

I claim:
1. A filter cell comprising a housing having an inlet for liquid to be filtered, said liquid being supplied under presure to said inlet, a filter member in said housing for the passage of the liquid therethrough to undergo filtering, said housing having an outlet in operative association with said filter member to receive and discharge filtered liquid after passage through said filter member, said housing having a discharge orifice between said inlet and said filter, valve means for closing the orifice whereby the liquid flows from said inlet to said outlet via said filter member, means for opening said valve means, means for providing backflow of liquid which has passed through said filter member upon opening of said discharge orifice, an open-mesh scraping member in said housing supported adjacent the filter member in sliding relationship, said scraping member having interstices larger than the openings of said filter member, and actuating means coupled to said scraping member and operatively associated with said valve means to cause slidable displacement of said scraping member over said filter member along a distance greater than the dimension of the openings of said filter member each time said valve means is operated to open said orifice and initiate backflow.

2. A cell as claimed in claim 1, wherein said filter member comprises a filter plug and a deformable sleeve of fine mesh woven material encircling said plug, said scraping member being constituted as a sleeve surrounding said deformable sleeve, said deformable sleeve being spaced from said scraping member during normal flow of liquid under pressure and undergoing deformation during back flow to contact said scraping members.

3. A cell as claimed in claim 1, wherein said actuating means comprises means rigidly coupling said valve member and scraping member for common movement.

4. A cell as claimed in claim 3 comprising spring means acting on said scraping member in a direction opposite that of the actuating means.

5. A cell as claimed in claim 1, wherein said actuating means comprises a partition member in said cell between said filter member and said orifice, said partition member having a hole therein, and movable element secured to said scraping member for movement therewith for normally closing, at least partly, said hole in the absence of a backflow current, whereby, upon opening of said valve means, said movable element is moved towards said orifice by the force resulting from the difference in the upstream and downstream pressures exerted on said movable element to actuate said scraping member.

6. A cell as claimed in claim 1, wherein said means for producing backflow comprises means in said housing defining a restricted passageway from said inlet to said filter member, the liquid flowing from said inlet through said passageway and along said filter member to said disoutlet, during normal flow and flowing rapidly through said passageway and along said filter member to said discharge orifice when the latter is open.

7. A cell as claimed in claim 6, wherein said means which is coupled to the scraping member and is associated with the valve means comprises a rigid coupling joining said valve means and scraping member for common movement.

8. A cell as claimed in claim 6, wherein said actuating means comprises a disc rigidly coupled to said scraping member and means for applying variable pressure on said disc in response to opening and closing of said orifice.

9. A cell as claimed in claim 6, wherein said filter member is tubular and said orifice is axially aligned with the filter member.

References Cited

UNITED STATES PATENTS

| | | | |
|---|---|---|---|
| 357,402 | 2/1887 | McLean et al. | 210—413 |
| 419,606 | 1/1890 | Jewell | 210—413 |
| 781,039 | 1/1905 | Weabe | 210—414 |
| 786,549 | 4/1905 | Dion | 210—413 |
| 921,011 | 5/1909 | Shepard | 210—413 X |
| 2,015,355 | 9/1935 | Snow et al. | 210—108 X |
| 2,066,479 | 1/1937 | MacIsaac | 210—414 X |

FOREIGN PATENTS 1,137,367  5/1957  France.

REUBEN FRIEDMAN *Primary Examiner.*

J. ADEE, *Assistant Examiner.*

U.S Cl. X.R.

210—408, 413